United States Patent Office 3,444,072
Patented May 13, 1969

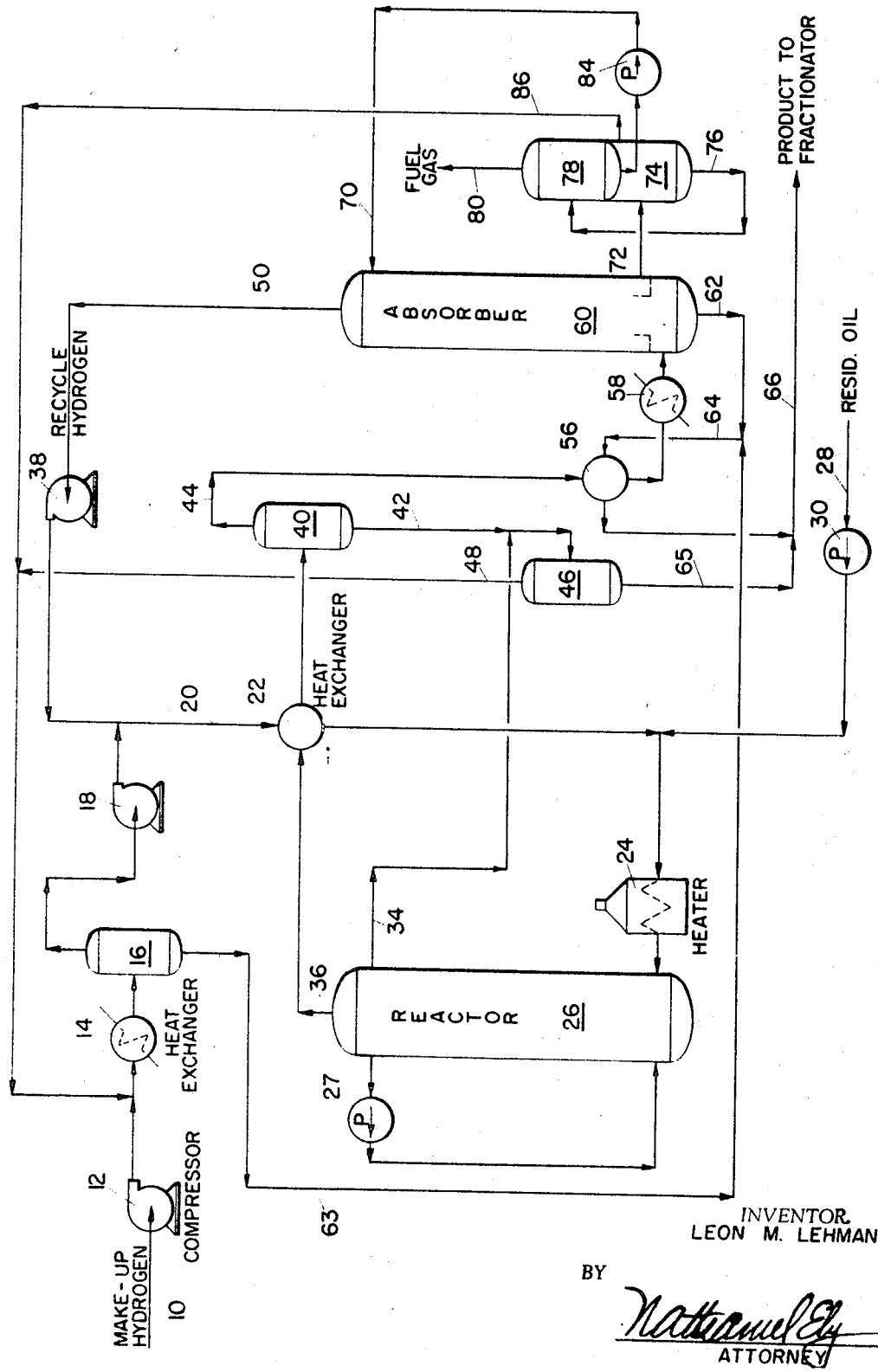

3,444,072
METHOD FOR MINIMIZING HYDROGEN LOSSES IN HIGH PRESSURE PROCESSES
Leon M. Lehman, Brooklyn, N.Y., assignor to Hydrocarbon Research, Inc., New York, N.Y., a corporation of New Jersey
Continuation of application Ser. No. 413,503, Nov. 24, 1964. This application Sept. 25, 1967, Ser. No. 683,422
Int. Cl. C10g *13/00, 13/24, 23/00*
U.S. Cl. 208—102                                      10 Claims

ABSTRACT OF THE DISCLOSURE

A method for minimizing the losses of hydrogen dissolved in the liquid effluent in high pressure hydrogenation processes by separating the vaporous effluent from the liquid effluent at substantially reaction temperature and pressures and subsequently flashing the liquid effluent at substantially reaction temperature but at pressures intermediate to the reaction pressure and the pressures at which the vent gas is released.

Cross references to other applications

This application is a continuation of my earlier co-pending application, Method for Minimizing Hydrogen Losses In High Pressure Processes, Ser. No. 413,503, filed Nov. 24, 1964 now abandoned.

Background of the invention

This invention relates to improvements in hydrogenation processes and particularly to the minimizing of hydrogen losses by liquid solution in high pressure hydrogen processes.

In the typical petroleum and chemical refining processes involving hydrogenation, including hydrodesulfurization, hydrocracking, hydrodealkylation and other hydrotreating operations, I have found that there is a very substantial and undesirable loss of hydrogen when the hydrogen associated liquids are flashed from reaction pressures to the final pressure to which the vent gas is released.

Summary of the invention

This invention recovers hydrogen from liquid effluents by flashing the liquids at pressures intermediate to the reaction pressure and the final presure to which the vent gas is released.

Though clearly applicable to any process involving hydrogen, it is more specifically concerned with systems involving hydrogen contacting in the pressure range of 500 p.s.i.g. to 5000 p.s.i.g. The intermediate flashing of such liquids is most economically done in the range of 0.20 to 0.75 of the contacting pressure where a single stage of intermediate flash is used. As discussed below, it may be advantageous to use more than one intermediate flash with the liquid then being flashed to two or more such intermediate flashes. In the case of multiple intermediate flashes, the range of pressures for these flashes would be from 0.1 to 0.9 of the contacting pressure.

Decreasing the pressure of the intermediate flash increases the recovery of hydrogen. However, as the pressure is lowered the energy required to recompress the hydrogen to contacting pressure is increased. Furthermore, decreased pressure also increases the amount of other components, such as light hydrocarbons, which are returned to the contacting system along with the recompressed hydrogen. In addition to increasing the energy requirement for recompression, these impurities either reduce the hydrogen partial pressure in the contacting section or impose an additional burden on a purification system operating to maintain a fixed hydrogen partial pressure. The amount of these impurities can be minimized by flashing in stages as this results in greater selectivity in favor of hydrogen vaporization. Thus a given amount of hydrogen recovered by flashing in two or more stages will carry along less impurities than if the same amount of hydrogen were recovered in a single intermediate flash.

It is generally the case that the makeup hydrogen is introduced to the high pressure contacting system by multiple stage compression. It then may be most convenient to send the flashed vapor to the interstage of such a compressor. However, if desired, separate compression for this recovered hydrogen may be provided.

A particular application of this invention is in connection with purification systems run in conjunction with the high pressure hydrogen process where impurities are removed by absorption in a suitable lean oil. These purification systems are frequently required as the total hydrogen feed to the reactor greatly exceeds the amount required by the stoichiometry of the reactions involved. In such cases it is desirable to recycle hydrogen within the high presure system to minimize costly hydrogen makeup. In recycle systems provision must often be made to prevent the buildup of volatile impurities in the recycle gas. These impurities may enter the system in the hydrogen makeup or may be produced as necessary products in the reactor. In petroleum refinery processes, for example, the impurities most often encountered in hydrogen recycle gas are light hydrocarbons and hydrogen sulfide. When these impurities are removed by absorption in a lean oil, a considerable amount of hydrogen is necessarily also absorbed. If this lean oil is flashed at intermediate pressures, substantial proportions of this hydrogen can be recovered.

As an illustration of this application, a 10,000 b.p.s.d. hydrocracking unit was studied in which hydrogen reacts with heavy residual oil derived from the bottoms of a vacuum flashing unit. The reactor is operated at 2,000 p.s.i.g. with the recycle hydrogen being maintained at a purity of 75% by absorption of impurities in lean oil. Both net effluent liquid and rich oil from the absorber were sent to a 1,000 p.s.ig. flash drum with the vapor from this drum going to the interstage of the makeup hydrogen compressor. This scheme showed an increased profit of 1.3¢/bbl. or $130 per day over the same operation without the 1,000 p.s.i.g. flash drum. This increased profit was due to the savings in hydrogen makeup requirement debited by the increased capital and utilities requirement.

Another important application of this invention is largely due to the unique properties of hydrogen. Unlike most gases, the solubility of hydrogen in liquids increases with increasing temperature. Thus its solubility at 900° F. may be five times as great as it is at 100° F. This behavior is particularly significant in the hydrogen treating of certain oils which remain substantially in the liquid phase in the reactor.

In many cases the liquid from the reactor must go to some fractionation system. If the liquid is cooled to ambient conditions it will have to be reheated prior to fractionation. This is costly both with respect to equipment required and with respect to increased utilities requirement. However, if the liquid from the reactor is fed directly to a fractionator, the hydrogen loss will be excessive. By use of this invention the hydrogen loss can be minimized and held to an acceptable level. The reactor liquid is simply flashed, either in a single stage or multiple stages, with the flashed hydrogen containing vapor being returned to the reactor. For practical reasons of compressor construction, this flashed vapor may be cooled to ambient temperature before its recompression to reactor pressure. However, this duty is very much smaller than the cooling of the entire reactor liquid effluent.

This invention is particularly applicable to processes where reactor liquid is fractionated with the heavier portion being recycled to the reactor. Such processes are often necessary to obtain high, or even total, conversion of heavy oils by hydrocracking to light oils. In such cases the situation discussed above is more acute as the liquid effluent from the reactor may greatly exceed the fresh feed due to the recycle. Consequently it is particularly important to avoid unnecessary cooling and heating of the reactor liquid effluent as well as to minimize the hydrogen loss in this liquid. Consequently, this invention is particularly useful for this type of process.

In certain cases a substantial portion of the material in the vapor reactor effluent will condense at temperatures intermediate between ambient temperature and the reaction temperature. In such cases it may be desirable to flash the vapor reactor effluent at these intermediate temperatures and separate the liquid from the vapor. The vapor from this intermediate temperature flash is then cooled to ambient temperature in high pressure heat exchangers. It is clear that this invention is applicable to any liquids withdrawn from contact with hydrogen at high pressure and will serve to reduce hydrogen solution losses.

The object of my invention is to provide for the effective recovery of hydrogen from high pressure hydrogenation systems.

Description of the drawing

Further objects and advantages of the invention will appear from the following description of a preferred form of embodiment thereof when taken in connection with the drawing attached hereto, such drawing being a schematic flow diagram of a hydrocracking operation on a residual oil.

Description of preferred embodiment

A preferred hydrocracking process such as described in the patent to Johanson, 2,987,465, entitled, Gas-Liquid Contacting Process, utilizes a source of hydrogen shown at 10 which is compressed to 1250 p.s.i.g. by one or more stages of compression at 12. The hot gas from such compression is intercooled at 14 and then passes through a knockout drum 16 and is further compressed to reaction pressure by the last stage of compression in compressor 18. The high pressure hydrogen in line 20 may then be heated in a heat exchanger 22 and brought to final temperature in fired heater 24 before entering the reactor 26.

The residual oil feed at 28 is brought to reaction pressure by pump 30 and then joins the hydrogen gas prior to the heater 24 so that they are both brought to the desired reactor inlet temperature and pressure.

The hydrocracking reactor 26 operates preferably in the range of 1500 to 3000 p.s.i.g., but for the purpose of this illustration it operates at 2500 p.s.i.g., and at a temperature between 700 to 900° F. The hydrogen and residual oil react in the presence of solid particles which may have catalytic effect. As described in the above-mentioned Johanson patent, it is preferable to operate with an upflow of liquid and gas and at velocity which will tend to carry the solids in a random motion by an expansion of the bed of solid particles by at least 10% and usually not to exceed about 300%. The expansion of the bed is controlled in part by recycling a proper amount of liquid by pump 27 and by controlling the gas flow. This is referred to as the "ebullated" bed technique where the solid particles are maintained in random motion in the liquid without any substantial carryover of the particles from the reaction zone by the effluent liquid.

Net liquid effluent from the reaction zone 26 is withdrawn above the level of ebullating solid particles by line 34. In some cases, it may be preferred to withdraw net liquid from either the suction or discharge of pump 27. In this present scheme, a separate liquid withdrawal line is shown and the vapor from the reactor is withdrawn overhead at 36. Suitable height is provided in a reactor 26 above the liquid level to allow for proper separation of vapor and liquid.

The vapor in line 36 is conveniently cooled to a temperature in the range of 450° and 600° F. in heat exchanger 22 with preheating of the hydrogen-rich gas 20 going to the reactor 26. Vapor condensed in exchanger 22 is separated out in knockout drum 40 with the condensed liquid 42 drawn off at the bottom and the vapor 44 removed overhead.

The condensed liquid 42 is combined with the remaining net liquid 34 from the reactor and sent to flash drum 46. This drum is maintained at 1250 p.s.i.g. Its temperature is determined by the mixing of the two liquid streams and is in the range of 600°–800° F., so that the subsequent flashing takes place at substantially reaction temperature. Liquid 65 from this drum goes to line 66 and, in turn, to a product fractionator. Vapor 48 from flash drum 46 is a hydrogen containing stream and being at 1250 p.s.i.g., joins makeup hydrogen 10 leaving the early stages 12 of feed gas compression and going to intercooler 14. It is to be understood that the compressor 12, heat exchanger 14, knockout drum 16, and compressor 18 are intended to represent a typical multistage compressor.

The vapor 44 from drum 40 is cooled by heat exchange in 56 and water in 58 to ambient temperatures and enters the absorber 60 near the bottom. In the lower part of the absorber, liquid which has condensed during the cooling in 56 is removed at 62. This liquid is withdrawn from the bottom, heated by exchange in 56 and is also sent to line 66 to the product fractionator. This liquid 62 is not flashed at intermediate pressure, as were other liquids 34 and 42, because at ambient temperature the solubility of hydrogen in this relatively small amount of liquid is not excessive. In other processes where liquid is not withdrawn at higher temperature as at 34 and 42, or perhaps where it is desired or necessary to absolutely minimize liquid hydrogen losses, this stream 62 may be sent to an intermediate flash drum.

The top section of the absorber 60 contains either bubble cap trays, valve trays, sieve trays, appropriate packing or any of the devices well known to the art for promoting vapor-liquid contact. The vapor rising from the bottom portion is contacted in this section with lean oil 70 which absorbs light hydrocarbons and hydrogen sulfide from the vapor as well as some hydrogen. The overhead 50 from the absorber 60 contain 70–80% hydrogen by volume. It is also returned to the reactor 26 by recycle compressor 38, combining with makeup hydrogen from compressor 18.

Rich oil 72, containing the components absorbed from the vapor in absorber 60 is removed from the bottom tray, or from beneath the packing, or from the bottom of whatever vapor-liquid contacting device is used in absorber 60. It is fed to flash drum 74 which is maintained at 1250 p.s.i.g. Vapor 86 from this flash drum 74 is a hydrogen containing stream and joins the makeup hydrogen going to intercooler 14.

Liquid 76 from flash drum 74 goes to flash drum 78 which is maintained at the pressure of the fuel gas system of the plant, generally 20 to 60 p.s.i.g. The vapor 80 from the flash drum 78 is fuel gas. Liquid removed from the flash drum 78 in line 70 is returned to the absorber 60 by pump 84 and serves as the lean oil.

It will be noted that two intermediate flash drums 46 and 78 have been provided. Vapors from these drums contain substantial amounts of hydrogen gas which are returned to the reactor by the interstage of the makeup compressor. The effect of these drums is to greatly reduce the hydrogen loss in the total liquid product 66 going to the fractionator and to the vapor product 80 going to fuel gas.

Many modifications of the invention will occur to those skilled in the art upon consideration of this disclosure without departing from the spirit or scope thereof and

I claim:

1. In a high pressure hydrogenation system wherein a liquid hydrocarbon is subjected in a reaction zone containing a bed of particulate contact material to conditions of elevated temperature and pressure in the range from about 500 p.s.i.g. to about 5000 p.s.i.g. in the presence of hydrogen to produce an effluent stream of hydrogenated liquid effluent containing dissolved unconsumed hydrogen and a vaporous effluent, the process of minimizing hydrogen losses due to dissolution which comprises:
 (a) separating the vaporous effluent from the liquid effluent at substantially reaction temperatures and pressures;
 (b) withdrawing the separated liquid effluent at substantially reaction temperatures and pressures;
 (c) flashing the liquid effluent at pressures 0.2 to 0.75 of the system pressure and at substantially reaction temperatures to give off a hydrogen-rich gas and recycling the hydrogen-rich gas to the reaction system without intermediate purification;
 (d) cooling the vaporous effluent to lower temperatures and separating therefrom a condensed liquid and thereafter flashing the separated condensed liquid at a pressure 0.2 to 0.75 of the system pressure to give off a hydrogen-rich gas and recycling the hydrogen-rich gas to the reactor system without intermediate purification.

2. The process as claimed in claim 1 wherein the temperature within the contacting zone is in the range from about 700° to about 900° F.

3. The process as claimed in claim 1 wherein the liquid and hydrogen are passed upwardly through the reaction zone at velocities such that the particulate contact material is placed in random motion by an expansion of the bed at least 10 percent.

4. The process as claimed in claim 1 wherein the separated, condensed liquid is combined with the liquid effluent and the combined liquids are flashed at a pressure 0.2 to 0.75 of the system pressure and at substantially reaction temperature.

5. The process as claimed in claim 4 wherein the reaction temperature is in the range from about 700° F. to about 900° F. and the temperature of the combined liquid is in the range from about 600° F. to about 800° F.

6. The process as claimed in claim 1 wherein the separated vapors are passed through an absorption stage in the presence of an absorber oil and the absorber oil is flashed at a pressure 0.2 to 0.75 of the system pressure whereby the absorber oil releases hydrogen containing gas and recycling said hydrogen containing gas to the system.

7. The process as claimed in claim 6 wherein the separated condensed liquid is combined with the liquid effluent and the combined liquids are flashed at a pressure 0.2 to 0.75 of the system pressure and at substantially reaction temperature.

8. The process as claimed in claim 7 wherein the reaction temperature is in the range from about 700° F. to about 900° F. and the temperature of the combined liquids is in the range from about 600° F. to about 800° F.

9. The process as claimed in claim 1 wherein the hydrogen-rich gas obtained from flash stages (c) and (d) are recycled to an interstage of a multiple stage compression system prior to being fed to the reaction system.

10. In a high pressure hydrogenation system wherein a liquid hydrocarbon is subjected in a reaction zone containing a bed of particulate contact material to conditions of elevated temperature and pressure in the range from about 500 p.s.i.g. to about 5000 p.s.i.g. in the presence of hydrogen to produce an effluent stream of hydrogenated liquid effluent containing dissolved unconsumed hydrogen and a vaporous effluent, the process of minimizing hydrogen losses due to dissolution which comprises:
 (a) separating the vaporous effluent from the liquid effluent at substantially reaction temperatures and pressures;
 (b) withdrawing the separated liquid effluent at substantially reaction temperatures and pressures;
 (c) flashing the liquid effluent in at least two stages at pressures from about 0.1 to about 0.9 of the system pressure and at substantially reaction temperatures to give off a hydrogen-rich gas and recycling said hydrogen-rich gas to the reactor system without intermediate purification;
 (d) cooling the vaporous effluent to lower temperatures and separating therefrom a condensed liquid and thereafter flashing the separated condensed liquid at a pressure 0.2 to 0.75 of the system pressure to give off a hydrogen-rich gas and recycling the hydrogen-rich gas to the reactor system without intermediate purification.

References Cited

UNITED STATES PATENTS

| | | | |
|---|---|---|---|
| 2,619,450 | 11/1952 | Fleming | 208—102 |
| 2,877,099 | 3/1959 | Bowles | 208—102 |
| 2,894,903 | 7/1959 | McGrath et al. | 208—216 |
| 2,915,457 | 12/1959 | Abbott et al. | 208—361 |
| 2,987,465 | 6/1961 | Johanson | 208—10 |
| 2,989,459 | 6/1961 | Eastman et al. | 208—102 |
| 3,026,260 | 3/1962 | Watkins | 208—59 |
| 3,206,389 | 9/1965 | Gast et al. | 208—58 |

HERBERT LEVINE, *Primary Examiner.*

U.S. Cl. X.R.

208—101, 103, 104, 105, 108